(12) United States Patent
Mandal

(10) Patent No.: US 11,821,301 B2
(45) Date of Patent: Nov. 21, 2023

(54) PREVENTING CEMENT CASING FAILURES BASED ON CASING ACOUSTIC IMPEDANCE

(71) Applicant: Halliburton Energy Services, Inc., Houston, TX (US)

(72) Inventor: Batakrishna Mandal, Sugar Land, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 96 days.

(21) Appl. No.: 17/568,655

(22) Filed: Jan. 4, 2022

(65) Prior Publication Data

US 2023/0212936 A1 Jul. 6, 2023

(51) Int. Cl.
  *E21B 47/005* (2012.01)
  *G01V 1/50* (2006.01)
  *G01V 1/48* (2006.01)
  *E21B 47/14* (2006.01)

(52) U.S. Cl.
  CPC ............. *E21B 47/005* (2020.05); *G01V 1/48* (2013.01); *G01V 1/50* (2013.01); *E21B 47/14* (2013.01)

(58) Field of Classification Search
  CPC ........... E21B 47/005; G01V 1/48; G01V 1/50
  See application file for complete search history.

(56) References Cited

U.S. PATENT DOCUMENTS

| | | | |
|---|---|---|---|
| 5,216,638 A * | 6/1993 | Wright | E21B 47/005 702/6 |
| 5,491,668 A | 2/1996 | Priest | |
| 5,644,550 A | 7/1997 | Priest | |
| 6,041,861 A | 3/2000 | Mandal et al. | |
| 8,339,276 B2 | 12/2012 | Mandal et al. | |

(Continued)

FOREIGN PATENT DOCUMENTS

| | | |
|---|---|---|
| EP | 1040251 B1 | 1/2012 |
| EP | 3179277 | 6/2017 |
| WO | 2021046385 | 3/2021 |

OTHER PUBLICATIONS

PCT/US2022/011193, "International Search Report and Written Opinion", dated Sep. 21, 2022, 8 pages.

(Continued)

*Primary Examiner* — Ian J Lobo
(74) *Attorney, Agent, or Firm* — Kilpatrick Townsend & Stockton LLP

(57) ABSTRACT

Certain aspects and features relate to a system that includes a well tool configured to transmit an acoustic signal, detect a reflection signal, and transmit data representing the reflection signal. A processor analyzes the data to identify a pulse portion of the reflection signal, which is distinct from a reverberation portion. The processor determines a value for an attribute of the reflection signal, and executes a model to generate a first set of synthetic values for the attribute of the reflection signal and a second set of synthetic values for an impedance of a cement casing. The processor can then generate a lookup table that correlates the first set of synthetic values to the second set of synthetic values. By referencing the lookup table, processor can determine the impedance of the cement casing and alter a drilling plan or a completion plan based on the impedance of the cement casing.

20 Claims, 12 Drawing Sheets

(56) References Cited

U.S. PATENT DOCUMENTS

| | | | |
|---|---|---|---|
| 8,767,506 B2* | 7/2014 | Froelich | E21B 47/005 367/35 |
| 9,157,312 B2 | 10/2015 | Zhao | |
| 9,594,177 B2 | 3/2017 | Froelich et al. | |
| 9,829,597 B2 | 11/2017 | Zeroug et al. | |
| 10,012,749 B2 | 7/2018 | Bose et al. | |
| 10,042,069 B2 | 8/2018 | Brill | |
| 10,280,733 B2 | 5/2019 | Mandal et al. | |
| 10,345,465 B2* | 7/2019 | Lemarenko | G01V 1/306 |
| 2014/0130591 A1 | 5/2014 | Adil et al. | |
| 2016/0033664 A1 | 2/2016 | Cheng et al. | |
| 2017/0114627 A1 | 4/2017 | Mandal et al. | |
| 2021/0246777 A1 | 8/2021 | Zhao et al. | |

OTHER PUBLICATIONS

Baker Hughes, "Simultaneous cement and casing evaluation", Overview—Ultrasonic Isolation explorer (ULTeX) service, available at https://www.bakerhughes.com/welldecom/wireline-well-integrity-evaluation/simultaneous-cement-and-casing-evaluation at least as early as Sep. 2021.

Halliburton Energy Services, Inc, "CAST-XR Tool Pushes the Limits of Circumferential Ultrasonic Cement Evaluation in High Wall-Thickness Casings", Product Sheet, 2016, 2 pages.

Schlumberger, "USI UltraSonic Imager Tool", Product Sheet, Aug. 2004, 2 pages.

Ullate et al., "Digital Signal Processing Simulations for a 2-D Ultrasonic Array System", 9th European Conference on NDT (ECNDT Fr.1.4.2), Sep. 2006, 10 pages.

Weatherford, "UltraView Tool", Product Sheet, 2015, 1 page.

\* cited by examiner

PREVENTING CEMENT CASING FAILURES BASED ON CASING ACOUSTIC IMPEDANCE

TECHNICAL FIELD

The present disclosure relates generally to cement casings in wellbores and, more particularly (although not necessarily exclusively), to preventing cement casing failures based on casing acoustic impedance in a wellbore.

BACKGROUND

Hydrocarbons, such as oil and gas, can be extracted from subterranean formations that may be located onshore or offshore. Hydrocarbons can be extracted through a wellbore formed in a subterranean formation. Wellbore operations for extracting hydrocarbons can include drilling operations, completion operations, and production operations. Wellbore completion operations can include pumping a cement slurry down an annulus between a wellbore and a steel pipe positioned within the wellbore. The cement can form a casing that can restrict fluid movement from the geographic formations into the wellbore and support the steel pipe within the wellbore. Completion and production operations can include data acquisition related to the cement casing.

DETAILED DESCRIPTION

Figure 1:
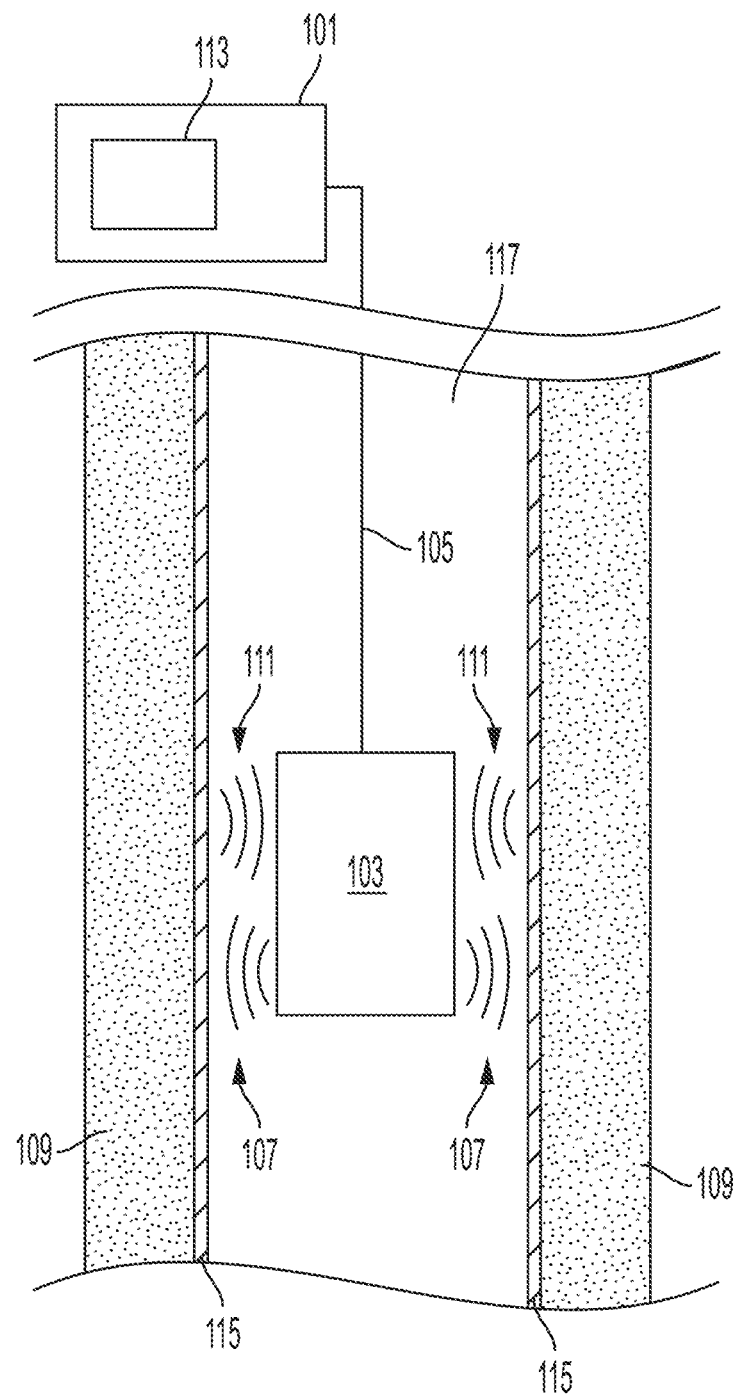
FIG. 1 is a cross-sectional view of a well system that includes a transducer transmitting and receiving acoustic signals downhole in a wellbore according to one example of the present disclosure.

Certain aspects and examples of the present disclosure relate to determining the quality of a cement casing in a wellbore and notifying a well operator of the same, so that cement failures can be prevented or mitigated. The quality can be determined based on the acoustic impedance of the cement casing. Acoustic impedance can be a measure of opposition that a system presents to an acoustic flow resulting from an acoustic pressure applied to the system. In some examples, a system can determine the acoustic impedance of a segment of a cement casing for use in evaluating the structural integrity of the segment of cement casing. It can be important that the cement casing have a high level of structural integrity because, in addition to restricting fluid movement between geological formations and supporting a steel pipe, the cement casing can protect the steel pipe from corrosion, can protect the steel pipe from high pressure shock loads that may result from deep drilling, and can seal off geological formations that may have received an uncontrolled flow of drilling mud. If the acoustic impedance of the segment of cement casing is below a predetermined threshold, it may signify that the cement casing is structurally unsound or not bonded correctly. This could lead to a collapse of the wellbore or otherwise jeopardize proper functioning of the wellbore. To prevent such issues, in some examples the system can alert the wellbore operator so that the segment of cement casing may be repaired to maintain the functionality of the cement casing.

To determine the structural integrity of the cement casing, a well tool may be positioned downhole. The well tool can include a transducer that can transmit an acoustic pulse into and receive an acoustic echo from a downhole environment that includes a cement casing. A reflection signal that results from the acoustic echo can contain characteristics associated with contents of the downhole environment. The system can receive the reflection signal and analyze its characteristics to determine an attribute of the reflection signal. Examples of the attribute can include the area or the quality factor of a frequency peak, where the frequency peak is derived from a group delay or a difference spectrum. The frequency peak can be used to rapidly determine the cement casing's thickness. For example, the system can include a look-up table that maps various values of the attribute to corresponding cement casing thicknesses. Using the look-up table, the system can rapidly determine the thickness of the cement casing. This may be a computationally faster and less intensive approach than alternative techniques for determining casing thickness.

A similar approach can be taken for the cement casing's impedance. For example, the system can include a look-up table that maps various values of the attribute to corresponding cement casing impedances. Using the look-up table, the system can rapidly determine the impedance of the cement casing. This may be a computationally faster and less intensive approach than alternative techniques for determining casing impedance.

In some examples, the look-up table can be generated using a forward modeling process. For example, relationships between reflection signal attribute(s), the cement casing thickness, and the cement casing impedance can be determined by a simulating forward model based on a pulse portion of one or more prior reflection signals that are different from a target reflection signal to be analyzed using the look-up table. Simulation time can be reduced to obtain a smaller number of cement casing thickness choices for forward modeling. The reflection signal attributes can then be fitted with a least-squared polynomial line (e.g., if generating a look-up table involving one attribute of the cement casing) or a polynomial surface (e.g., if generating a look-up table involving two or more attributes of the cement casing) to determine appropriate coefficients.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a cross-sectional view of a well system that includes a transducer 103 for transmitting acoustic signals 107 downhole in a wellbore 117 according to one example of the present disclosure. The transducer 103 can be part of any suitable well tool. The wellbore 117 can be drilled through one or more layers of a subterranean formation for extracting natural resources such as hydrocarbons therefrom. The wellbore 117 can be structurally supported by a steel pipe 115 that is bonded to the walls of the wellbore 117 by a cement casing 109.

In some examples, the transducer 103 can be positioned adjacent to the cement casing 109 in the wellbore 117. The transducer 103 can be positioned adjacent to the cement casing 109 using any suitable conveyance mechanism. In the example of FIG. 1, the transducer 103 is positioned downhole using a cable, but in other examples the transducer 103 may be positioned downhole using other conveyance mechanisms.

The transducer 103 can be translated through the wellbore 117 and rotatable about its central axis to emit acoustic signals 107 at various positions (e.g., depths and orientations) towards the cement casing 109. The transducer 103 can also receive reflection signals 111 from the cement casing 109, where the reflection signals 111 are reflections of the acoustic signals 107. The transducer 103 can transmit data associated with one or more of the reflection signals to a computing device 101. The data may be transmitted to the computing device 101 via a wired connection, such as a cable 105, or wirelessly. The computing device 101 may also be capable of transmitting signals to the transducer 103, for example via the cable 105.

The computing device 101 may contain a software module 113 capable of determining the acoustic impedance and thickness of the cement casing 109 from the reflection signal. The acoustic impedance and thickness may individually, or collectively, signify the structural integrity of the cement casing 109. If the computing device 101 determines that the acoustic impedance and/or the thickness is below a threshold, the computing device 101 may output an alert to a well operator or automatically transmit one or more signals to a control system. The control system may be configured to assist in preventing or mitigating a problem with the cement casing 109.

Figure 2:
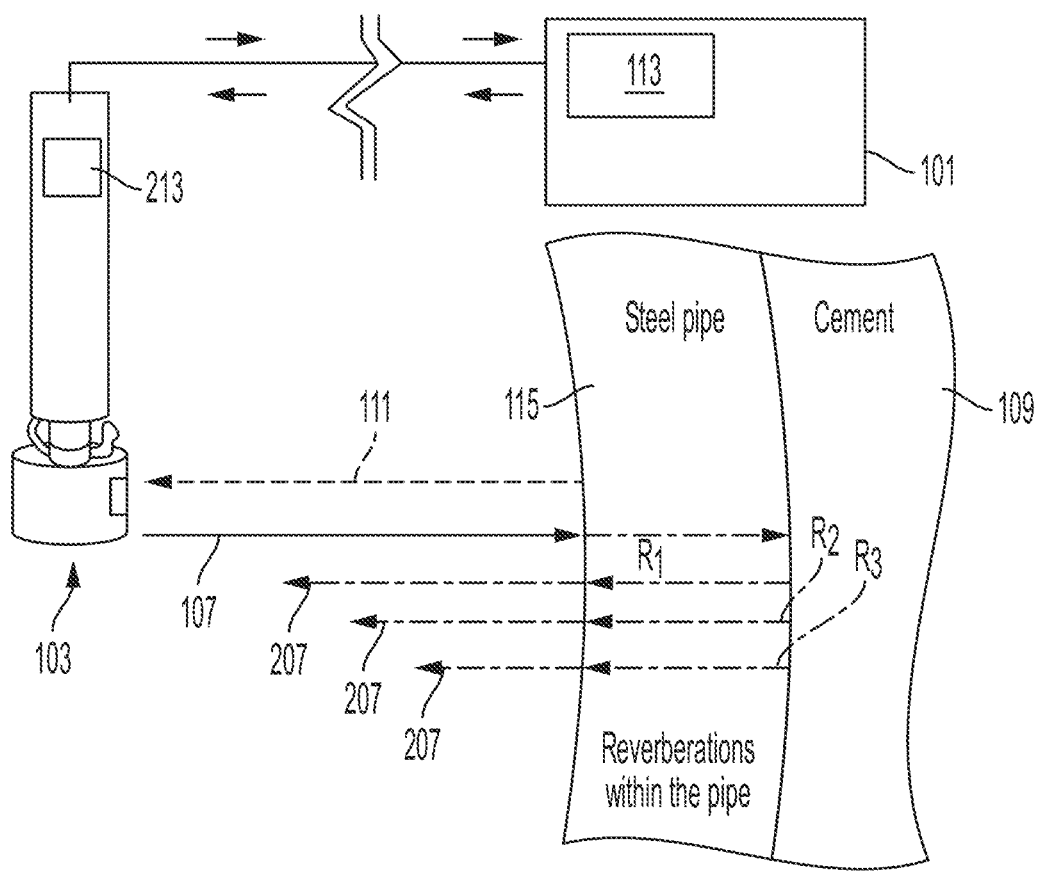
FIG. 2 is a cross-sectional view of a transducer transmitting and receiving acoustic signals downhole in a wellbore according to one example of the present disclosure.

FIG. 2 is a cross-sectional view of a transducer 103 transmitting and receiving acoustic signals downhole in the wellbore 117 according to one example of the present disclosure. The transducer 103 can transmit an acoustic signal 107 that can result in reflection signals 111, 207. The reflection signal 111 can contain a pulse portion and a reverberation portion, which are further described below with reference to FIG. 7. The reflection signal 111 may be influenced by physical characteristics of a steel pipe 115 and physical characteristics of the cement casing 109. The transducer 103 can transmit data associated with the reflection signal to a computing device 101 via a transmitter 213. As described above, The computing device 101 may contain a software module 113 capable of determining the acoustic impedance and thickness of the cement casing 109 based on the reflection signal 111. The computing device 101 may also be able to transmit instructions to the well tool containing the transducer 103 via the transmitter 213.

Figure 3:
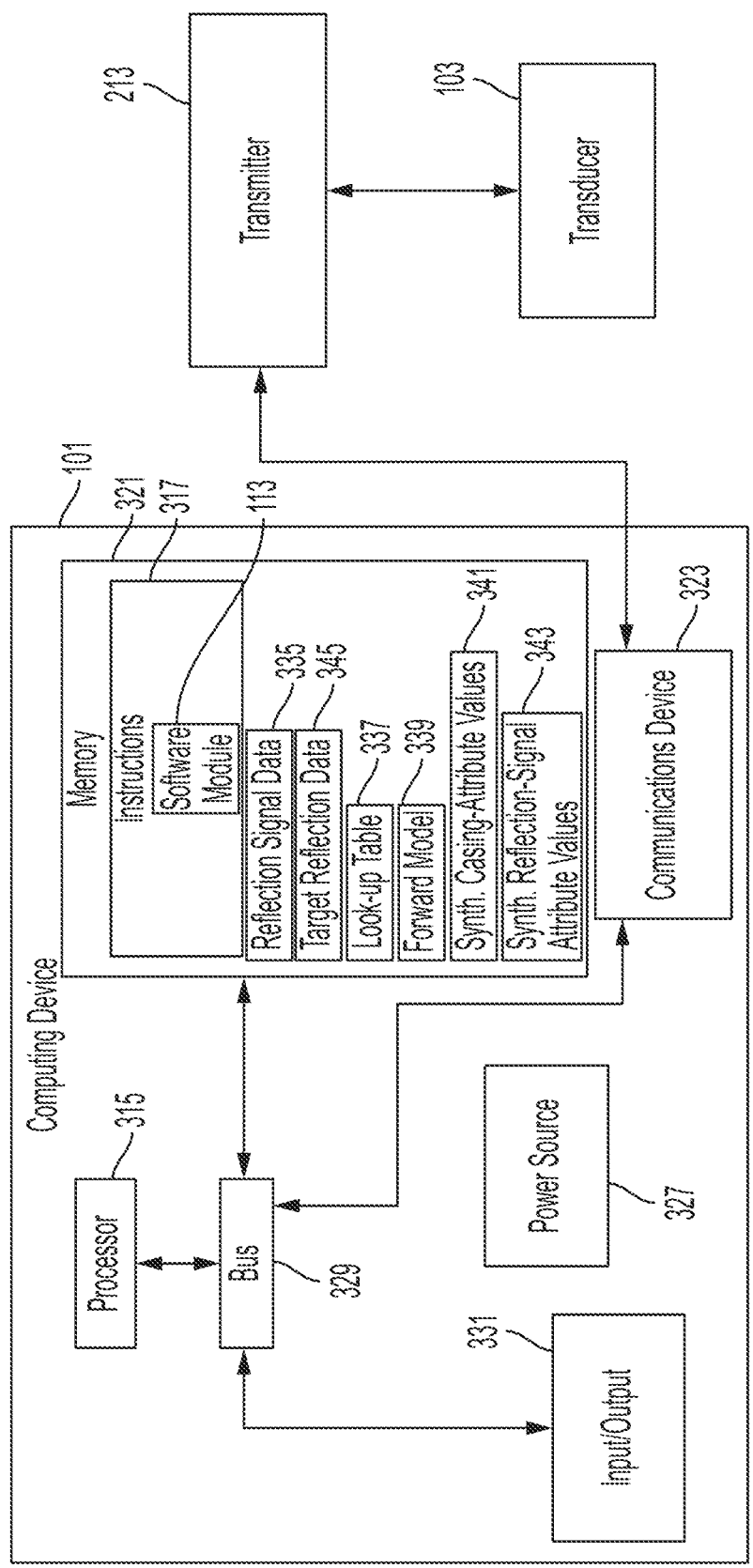
FIG. 3 is a block diagram of a computing device containing instructions to determine cement casing quality in a wellbore according to one example of the present disclosure.

FIG. 3 is a block diagram of the computing device 101 containing instructions 317 that are executable to determine the quality of a cement casing in a wellbore according to some aspects of the present disclosure. The components shown in FIG. 3 may be integrated into a single structure, such as within a single housing of a computing device 101. Alternatively, the components shown in FIG. 3 can be distributed from one another and in electrical communication with each other.

The computing device 101 can include the processor 315, a memory 321, and a bus 329. The processor 315 can execute one or more operations for determining cement-casing quality in the wellbore or for controlling the transducer 103. The processor 315 can include one processing device or multiple processing devices or cores. Non-limiting examples of the processor 315 include a Field-Programmable Gate Array (FPGA), an application-specific integrated circuit (ASIC), a microprocessor, or a combination of these.

The processor 315 can be communicatively coupled to the memory 321 via the bus 329. The non-volatile memory 321 may include any type of memory device that retains stored information when powered off. Non-limiting examples of the memory 321 may include electrically erasable programmable read-only memory (EEPROM), flash memory, or any other type of non-volatile memory. In some examples, at least part of the memory 321 can include a medium from which the processor 315 can read instructions 317. A computer-readable medium can include electronic, optical, magnetic, or other storage devices capable of providing the processor 315 with the computer-readable instructions or other program code. Non-limiting examples of a computer-readable medium include (but are not limited to) magnetic disk(s), memory chip(s), ROM, RAM, an ASIC, a configured processor, optical storage, or any other medium from which a computer processor can read instructions 317. The instructions 317 can include processor-specific instructions generated by a compiler or an interpreter from code written in any suitable computer-programming language, including, for example, C, C++, C#, etc. In some examples, the instructions 317 may include the software module 113 described above.

The memory 321 can include a reflection signal data 335, a look-up table 337, a forward model 339, a plurality of synthetic casing-attribute values 341, and a plurality of synthetic reflection-signal attribute values 343. The reflection signal data 335 can be data representing the reflection signal 111. The plurality of synthetic casing-attribute values 341 can include values for drilling mud impedance, cement casing thickness, or cement casing acoustic impedance. The processor 315 can use the reflection signal data 335 to generate the plurality of synthetic reflection-signal attribute values 343. For example, the reflection signal data 335 can be processed by the forward model 339 to create the plurality of synthetic reflection-signal attribute values 343 and the plurality of synthetic casing-attribute values 341.

The computing device 101 can also include a power source 327. The power source 327 can be in electrical communication with the computing device 319 and a communications device 323. In some examples, the power source 327 can include a battery or an electrical cable (e.g., a wireline). The power source 327 can include an AC signal generator.

The computing device 101 can transmit data to generate an acoustic pulse via the communications device 323. The communications device 323 can transmit the data to generate the acoustic pulse to the transmitter 213. The transmitter 213 can, using the data to generate an acoustic pulse, command the transducer 103 to generate the acoustic pulse. After generating the acoustic pulse, the transducer 103 can receive a reflection signal. The transducer 103 can transmit reflection signal data 335 related to the reflection signal to the transmitter 213. In some examples, the transmitter 213 can condition the reflection signal data 335. The transmitter 213 can transmit the reflection signal data 335 to the communications device 323, which in turn can transmit the reflection signal data 335 to the memory 321 via the bus 329. In some examples, the communications device 323 can condition the reflection signal data 335 received by the transmitter 213.

The computing device 319 in this example additionally includes an input/output interface 331. The input/output interface 331 can connect to a keyboard, point device, display, and other computer input/output devices. An operator may provide input using the input/output interface 331. Cement casing impedance values can be displayed to an operator of a completion operation through a display that is connected to or is part of the input/output interface 331. The displayed values can be observed by the operator, or by a supervisor of the completion operation, who can make adjustments based on the displayed values.

Figure 4:
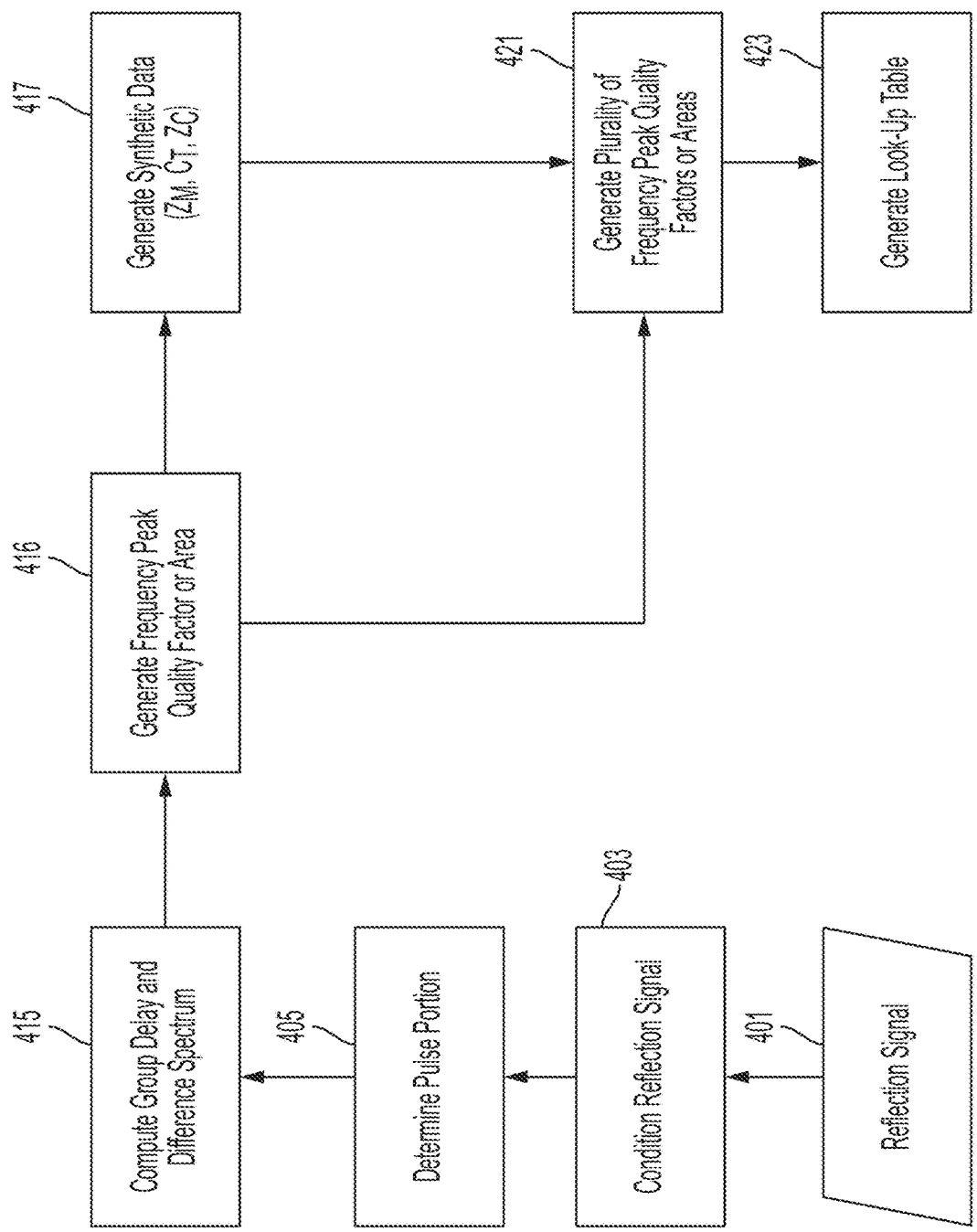
FIG. 4 is a block diagram of a process for generating a look-up table according to one example of the present disclosure.

FIG. 4 is a block diagram of a process for generating a look-up table 337 according to one example of the present disclosure. Other examples can include more steps, fewer steps, different steps, or a different order of the steps than is shown in FIG. 4. The steps of FIG. 4 are described below with reference to the components of FIG. 3 above.

In block 401, the processor 315 receives reflection signal data 335. The reflection signal data 335 is data representing a reflection signal. The reflection signal can be a reflection of an acoustic signal generated by the transducer 103 at a particular position (e.g., depth and/or angle) in the wellbore for purposes of generating the look-up table 337.

In some examples, the reflection signal data 335 may have been stored in the memory 321 of the computing device 101 and received therefrom. Alternatively, the reflection signal data 335 may be received directly to a cache of the processor 315.

In block 403, the processor may condition (e.g., preprocess) the reflection signal data 335. For example, the processor can condition the reflection signal data 335 to reduce direct current (DC) offset bias or to filter noise. To manage bandwidth across the cable 105, some or all of the conditioning of the reflection signal data 335 may also occur via electronics within the well tool before the reflection signal data 335 reaches the processor 315.

In block 405, the processor 315 may determine a pulse portion of the reflection signal data 335. The processor 315 may determine the pulse portion apart from a reverberation portion by identifying a significant change in amplitude and reduced periodic characteristics of the pulse portion as compared to the reverberation portion.

In block 415, the processor 315 may determine a group delay and a difference spectrum of the reflection signal data 335. The group delay and the difference spectrum of the reflection signal data 335 may represent a relationship between (i) the pulse portion and (ii) a span of the reflection signal data 335 that includes the pulse portion and the reverberation portion. The group delay may represent a time delay between amplitude envelopes of the pulse portion and the span of the reflection signal data 335. The difference spectrum may represent a fast Fourier transform of the span of the reflection signal data 335 subtracted form a fast Fourier transform of the pulse portion of the reflection signal data 335.

In block 416, the processor 315 may determine a frequency peak of the group delay and a frequency peak of the difference spectrum. The processor may also determine quality factors of the frequency peaks or areas under the frequency peaks. The quality factors or areas under the frequency peaks may be stored in the memory 321, or the cache of the processor 315, or stored in any other manner for subsequent operations.

In block 417, the processor 315 may generate a plurality of synthetic casing-attribute values 341 based on the quality factors and/or areas of the frequency peaks determined in block 416. For example, the processor 315 can generate the plurality of synthetic values using the forward model 339. Examples of the synthetic casing-attribute values 341 can include synthetic values for drilling mud impedance, a plurality of synthetic values for cement casing thickness, and/or a plurality of synthetic values for cement casing acoustic impedance.

In block 421, the processor 315 may generate a plurality of synthetic reflection-signal attribute values 343, such as synthetic values for the quality factors or areas of the frequency peaks, based on the actual quality factors and/or areas of the frequency peaks determined in block 416. The quality factor values may represent a frequency of a frequency peak divided by the change in frequency of the frequency peak across a given interval. The area of the frequency peak may represent an area under a given interval. In some examples, the plurality of synthetic reflection-signal attribute values 343 may be determined by comparing the group delay of the reflection signal data 335 to the difference spectrum of the reflection signal data 335.

In block 423, the processor 315 may generate a look-up table 337 by correlating the plurality of synthetic casing-attribute values 341 to the plurality of synthetic reflection-signal attribute values 343. The processor may correlate the two pluralities across a squared polynomial line or a polynomial surface.

Figure 5:
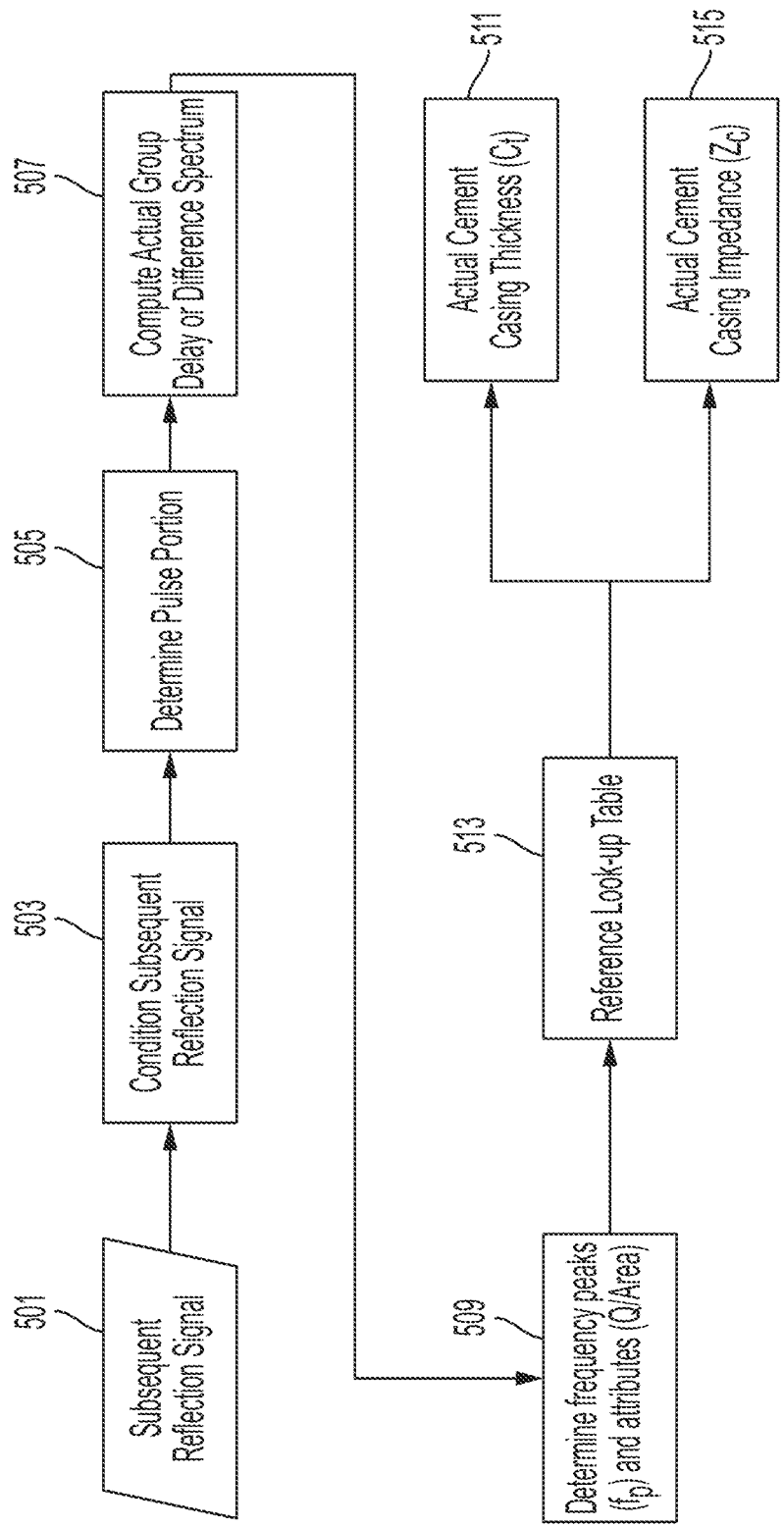
FIG. 5 is a block diagram of a process for referencing a look-up table to determine the impedance and thickness of a cement casing according to one example of the present disclosure.

FIG. 5 is a block diagram of a process for referencing a look-up table 337 to determine cement casing impedance and thickness according to one example of the present disclosure. Other examples can include more steps, fewer steps, different steps, or a different order of the steps than is shown in FIG. 5. The steps of FIG. 5 are described below with reference to the components of FIG. 3 above.

In block 501, the processor 315 receives target reflection data 345 for a target reflection signal to be analyzed. The target reflection data 345 is distinct from the reflection signal data 335, and the target reflection signal is distinct from the reflection signal represented by the reflection signal data 335. The target reflection signal can be a reflection of an acoustic signal generated by the transducer 103 at a target position in the wellbore for purposes of analyzing the structural characteristics of the cement string at that position.

In some examples, the target reflection data 345 may have been stored in the memory 321 of the computing device 101 and received therefrom. Alternatively, the target reflection data 345 may be received directly to the cache of the processor 315.

In block 503, the processor 315 may condition the target reflection data 345, for example to reduce direct current (DC) offset bias or to filter noise. To manage bandwidth across the cable 105, some or all of the conditioning of the reflection signal data may also occur via electronics within the well tool before the target reflection data 345 reaches the processor 315.

In block 505, the processor 315 may determine a pulse portion of the target reflection data 345. The processor may determine the pulse portion apart from a reverberation portion by identifying a marked change in amplitude and minimal periodic characteristics.

In block 507, the processor 315 may determine the actual group delay or actual difference spectrum of the target reflection data 345. The group delay and the difference spectrum of the reflection signal data may represent a relationship between the pulse portion and a length of the target reflection data 345 that includes both the pulse portion and the reverberation portion. The group delay may represent a time delay between amplitude envelopes of the pulse portion and the span of the target reflection data 345. The difference spectrum may represent a fast Fourier transform of the span of the target reflection data 345 subtracted form a fast Fourier transform of the pulse portion of the target reflection data 345.

In block 509, the processor 315 may determine a frequency peak of the actual group delay and/or a frequency peak of the actual difference spectrum. The processor 315 may then determine attributes of the frequency peaks (e.g., quality factors of the frequency peaks or areas under the frequency peaks). The quality factor values may represent a frequency of a frequency peak divided by the change in frequency of the frequency peak across a given interval. The area of the frequency peak may represent an area under a given interval.

In block 513, the processor 315 may reference the look-up table 337 generated in block 423. Using the look-up table 337, the processor 315 can determine the actual thickness and/or actual acoustic impedance of the cement casing based on the attributes determined in block 509. For example, as shown in block 511, the processor 315 may use the frequency peak to look up the corresponding cement-casing thickness in the look-up table. As another example shown in block 515, the processor 315 may use the area of a frequency peak to look up the corresponding acoustic-impedance value in the look-up table. In this way, the processor 315 can estimate the cement-casing thickness and acoustic impedance associated with the cement casing at a target position.

Figure 6:
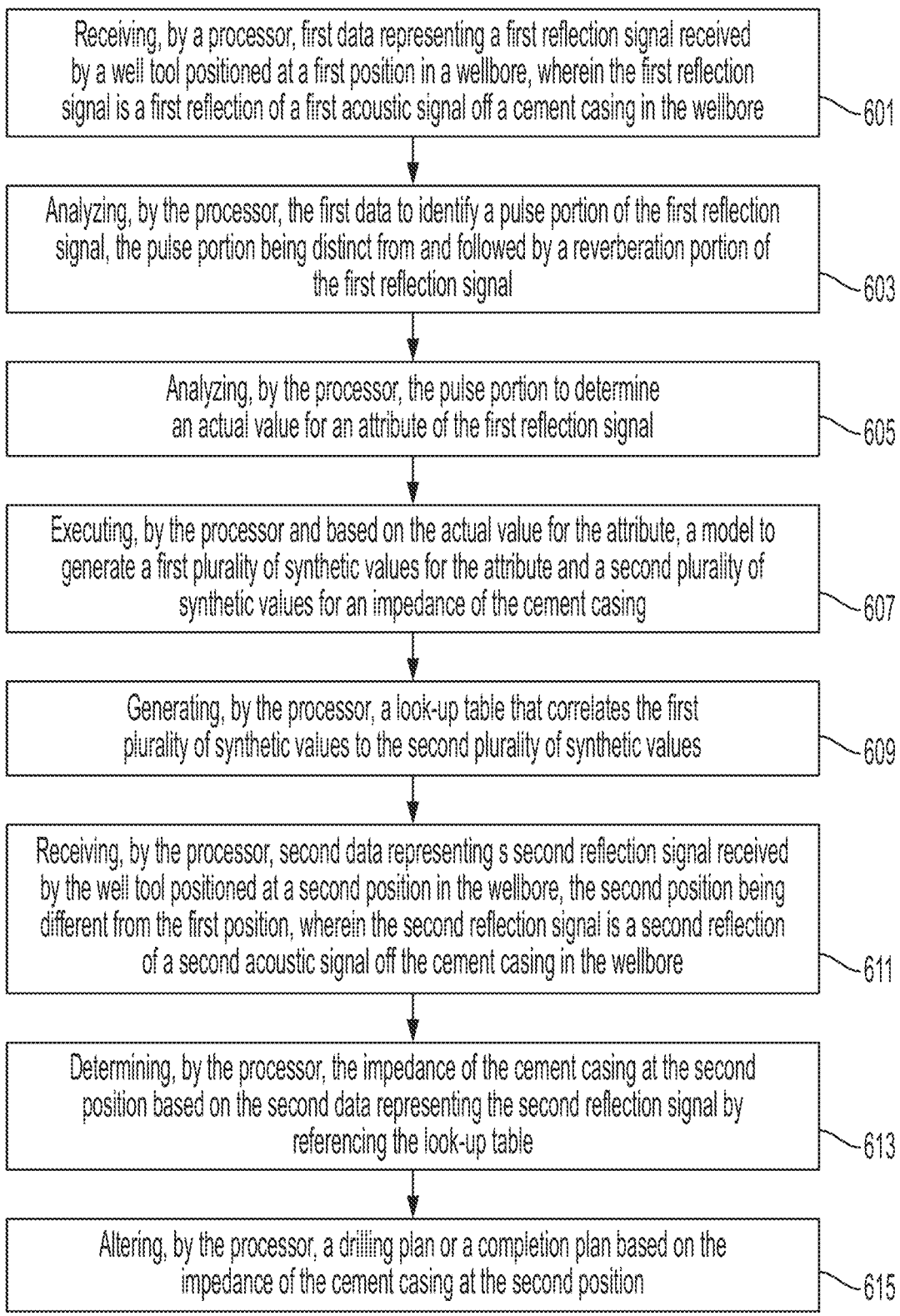
FIG. 6 is a flowchart of a process for altering a drilling plan or drilling behavior in response to an estimated impedance of a cement casing according to one example of the present disclosure.

FIG. 6 is a flowchart of a process for altering a drilling plan or completion plan based on the impedance of the cement casing at a second position, according to one example of the present disclosure. Other examples can include more steps, fewer steps, different steps, or a different order of the steps than is shown in FIG. 6. The steps of FIG. 6 are described below with reference to the components of FIG. 3 above.

In block 601, the processor 315 can receive a first data representing the first reflection signal received by a well tool, where the first reflection signal can be a reflection of an acoustic signal off the cement casing in a wellbore. The first reflection signal may have been generated for purposes of constructing a look-up table for subsequent use in relation to another reflection signal. To generate the first reflection signal, the well tool can be equipped with the transducer 103 (e.g., an acoustic transducer).

In some examples, the processor 315 may condition (e.g., preprocess) the first data to correct direct current (DC) offset bias, to filter signal noise, or for other reasons. Alternatively, the processor 315 may receive the reflection signal partially or completely conditioned by electronics within the well tool. The well tool may condition the first data to reduce bandwidth required to transmit the reflection signal to the processor 315.

In block 603, the processor 315 can analyze the first data to identify a pulse portion of the first reflection signal. The pulse portion can be distinct from, and be followed by, a reverberation portion of the first reflection signal. The pulse portion can be characterized by greater signal amplitudes than those exhibited by the reverberation portion.

With the pulse portion identified, a group delay can be determined by subtracting a first group delay of the pulse portion from a second group delay of a span of the first reflection signal. The span can include both the pulse portion and the reverberation portion. The processor 315 can compute the group delay of the pulse portion from a frequency spectrum of the pulse portion. The processor 315 can compute the frequency spectrum of the pulse portion from a fast Fourier transform of the pulse portion. The processor 315 can compute the group delay of the span of the first reflection signal from a frequency spectrum of the first reflection signal, also computed from a fast Fourier transform. A difference spectrum associated with the first reflection signal can also be determined by subtracting a fast Fourier transform of the span of the first reflection signal from a fast Fourier transform of the pulse portion.

In block 605, the processor 315 can analyze the pulse portion to determine an actual value for an attribute of the first reflection signal. The attribute of the first reflection signal can be a trait of the group delay associated with the first reflection signal. The attribute of the first reflection signal may alternatively be a trait of the difference spectrum associated with the first reflection signal. In some examples, the attribute can be a quality factor of a frequency peak, or an area of the frequency peak, from either the group delay or the difference spectrum associated with the first reflection signal. The attribute can also be a natural logarithm or a reciprocal of the quality factor or area of the frequency peak associated with either the group delay or the difference spectrum.

In block 607, the processor 315 can execute a model, such as the forward model 339, to generate a first plurality of synthetic values for the attribute of the first reflection signal and a second plurality of synthetic values for an impedance of the cement casing or a thickness of the cement casing. The second plurality of synthetic values may be similar to the plurality of synthetic casing-attribute values 341 described above. The first plurality of synthetic values may be similar to the plurality of synthetic reflection-signal attribute values 343 described above. For example, the model can generate dozens or hundreds of synthetic values for the attribute of the first reflection signal. The model can also generate dozens or hundreds of synthetic values for the impedance of the cement casing, for the cement casing thickness, or both.

In block 609, the processor 315 can generate the look-up table 337 that correlates the first plurality of synthetic values to the second plurality of synthetic values. To do so, the first and second plurality of synthetic values can be fitted with a least-square polynomial line. In some examples, a least-square polynomial surface can be used to correlate the first and second pluralities of values.

In block 611, the processor 315 can receive second data representing a second reflection signal. The second reflection signal may be received by the well tool positioned at a second position in the wellbore. The second position may be different from the first position. The second reflection signal may be a second reflection of a second acoustic signal off the cement casing in the wellbore.

In block 613, the processor 315 can determine the impedance of the cement casing at the second position, based on the second data by referencing the look-up table 337. In some examples, the look-up table can be dynamically updated such that its contents are updated over time, for example after receiving new data from the well tool. In this way, the stored look-up table 337 can serve as a starting point for future look-up tables. The processor 315 may reference the look-up table using the second data, which may be distinct from the first data representing the first reflection signal.

In block 615, the processor 315 can alter a drilling plan or completion plan based on the impedance of the cement casing at the second position. For example, the processor can transmit one or more signals to a drilling tool or a completion tool for adjusting the drilling plan or completion plan. Alternatively, the impedance of the cement casing can be displayed so that a human operator can make similar alterations. Alterations to a drilling or completion plan can be contingent on a predetermined threshold for acceptable cement casing impedance. In some examples, the processor 315 can output an alert to warn a well operator if the impedance of the cement casing is indicative of a structural integrity problem (e.g., if the impedance is below a threshold value).

Figure 7:
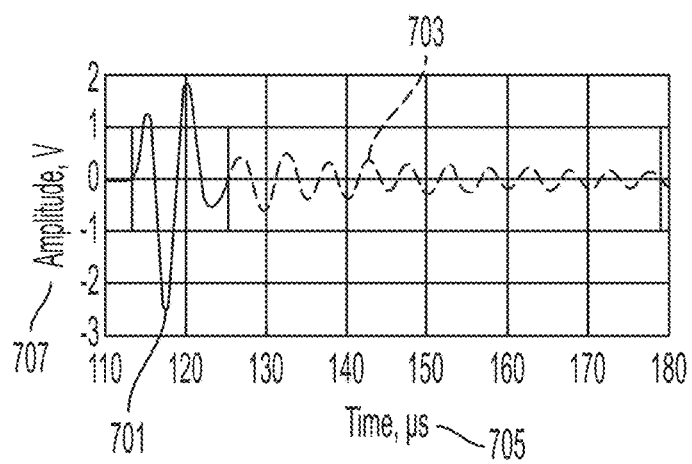
FIG. 7 is a graph depicting a reflection signal according to one example of the present disclosure.

FIG. 7 is a graph depicting a reflection signal according to one example of the present disclosure. The reflection signal may resemble the reflection signal received by the well tool in block 601. An X-axis 705 indicates time in microseconds. A Y-axis 707 indicates signal amplitude in volts. A pulse portion 701 of the reflection signal can be distinguished from a reverberation portion 703 by amplitude.

Figure 8:
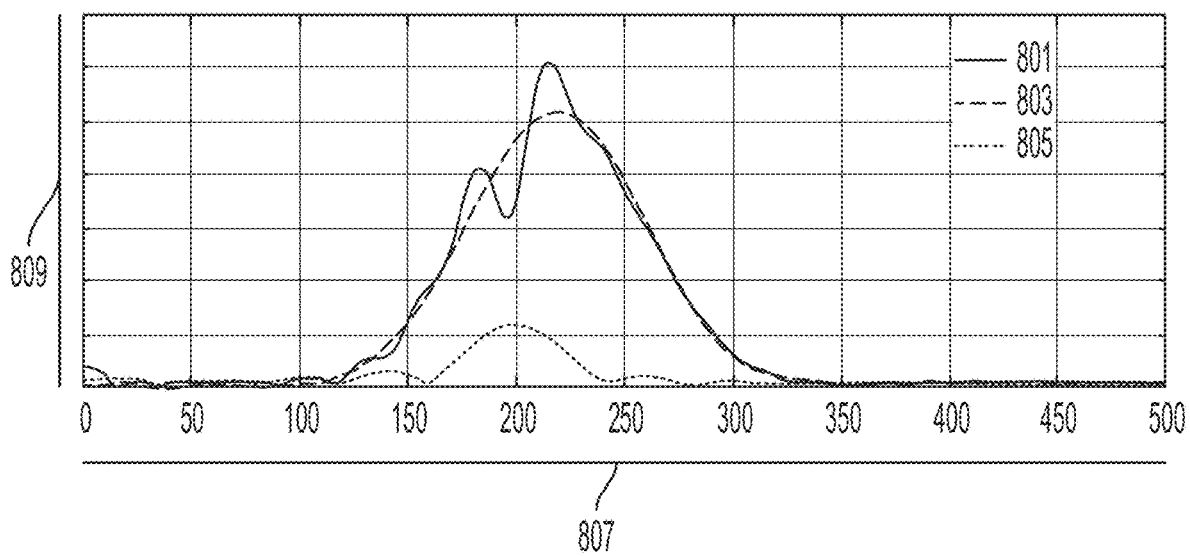
FIG. 8 is a graph depicting a frequency spectrum of a reflection signal according to one example of the present disclosure.

FIG. 8 is a graph depicting a frequency spectrum of a reflection signal according to one example of the present disclosure. The X-axis 807 indicates frequency in kilohertz. The Y-axis 809 indicates signal amplitude in volts. A Fast Fourier Transformation (FFT) of the reflection signal 801 can be characterized by a frequency peak greater than frequency peaks of the components. The FFT of the reflection signal 801 can also be characterized by a notch at approximately 200 kilohertz. The notch may be caused by acoustic energy leakage into the cement casing, may be caused by acoustic energy leakage into reverberations not captured by the well tool, and may be shaped by downhole substances such as air, water, and the cement casing. The reflection signal 801 may include both the pulse portion 803 and the reverberation portion 805. An FFT of a pulse portion 803 may have less periodic qualities than an FFT of a reverberation portion 805. In the present example, the FFT of the reverberation portion 805 can be characterized by frequency peaks near 150 kHz, 200 kHz, and 250 kHz. By contrast, the FFT of the pulse portion 803 can be characterized by one frequency peak near 220 kHz. The FFT of the pulse portion 803 may have greater symmetry than the FFT of the reflection signal 801 as well. A function characterized by both a single frequency peak and minimal periodic qualities, such as the FFT of the pulse portion 701, may be better suited to linear modeling than more nuanced shapes, such as the FFT of the reflection signal 801 or the FFT of the reverberation portion 805.

Figure 9:
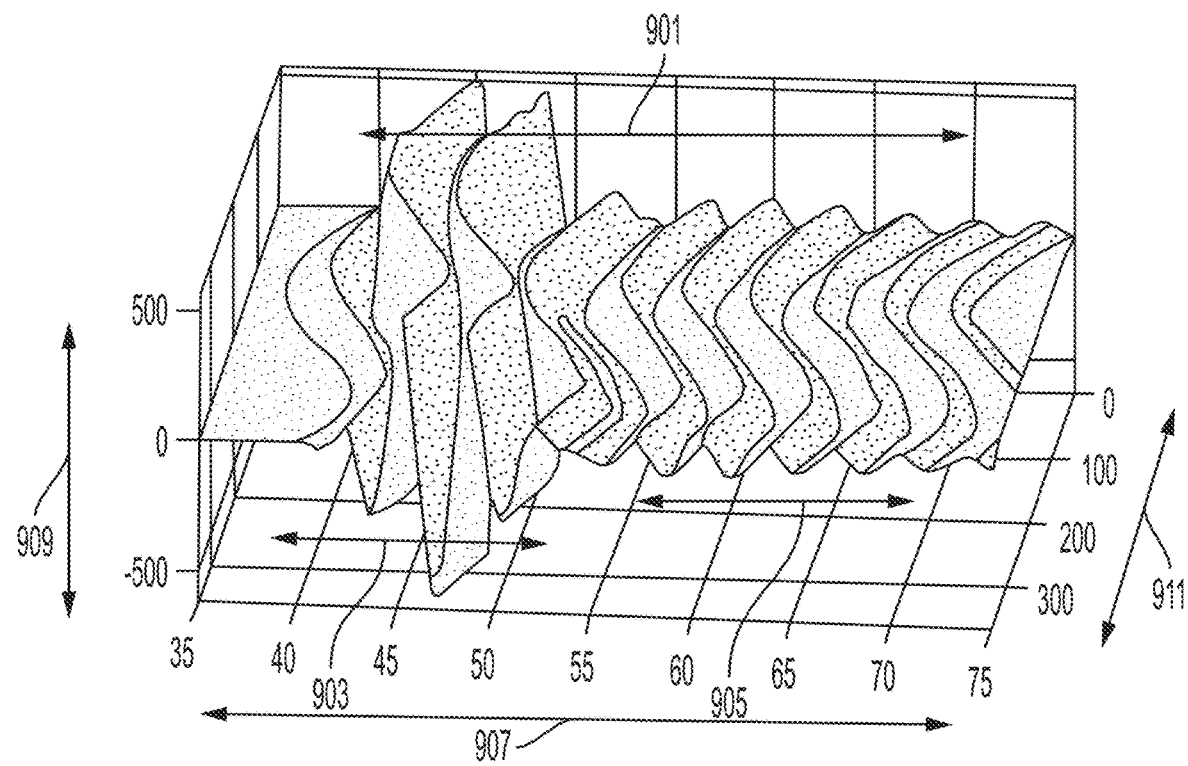
FIG. 9 is a is a graph depicting a circular reflection signal according to one example of the present disclosure.

FIG. 9 is a graph depicting a circular reflection signal 901 according to one example of the present disclosure. The X-Axis 907 indicates time. The Z-Axis 911 rotation angle (e.g., in degrees) of a transducer. The Y-Axis 909 indicates acoustic amplitude. The circular reflection signal 901 contain a pulse portion 903 and a reverberation portion 905. The pulse portion 903 can be distinguished from the reverberation portion 905 by amplitude.

Figure 10:
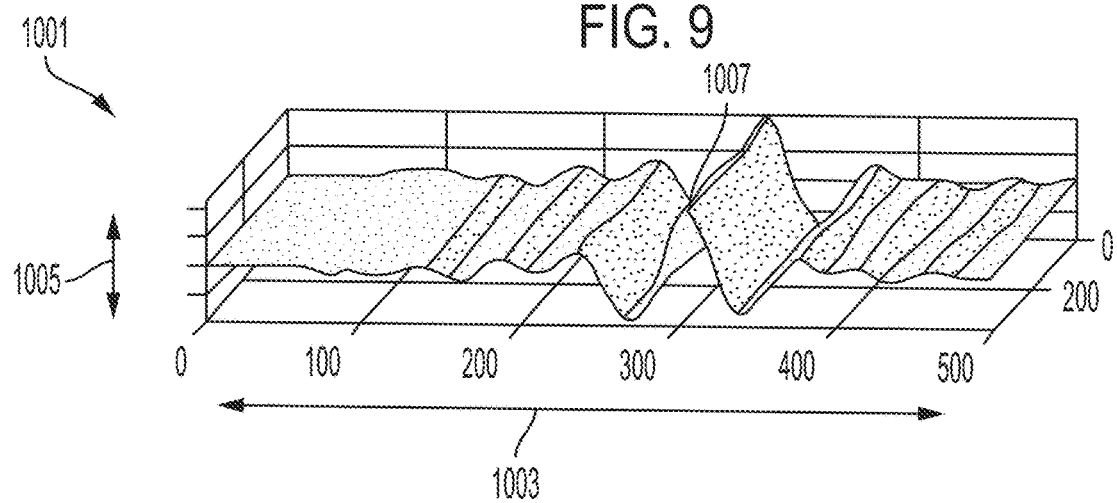
FIG. 10 is a graph depicting a difference spectrum associated with a circular reflection signal according to one example of the present disclosure.

FIG. 10 is a graph depicting a difference spectrum 1001 associated with a circular reflection signal according to one example of the present disclosure. The X-Axis 1003 indicates frequency. The Y-Axis 1005 indicates spectrum amplitude. The Z-Axis indicates rotation angle of the transducer. The difference spectrum can be computed by subtracting (i) a first frequency spectrum of the pulse portion of a reflection signal from (ii) a second frequency spectrum derived from a span of the reflection signal that includes both the pulse portion and a reverberation portion. A frequency peak 1007 of the difference spectrum 1001 may be used to derive an attribute, such as the quality factor or the area described above in block 605 of FIG. 6.

Figure 11:
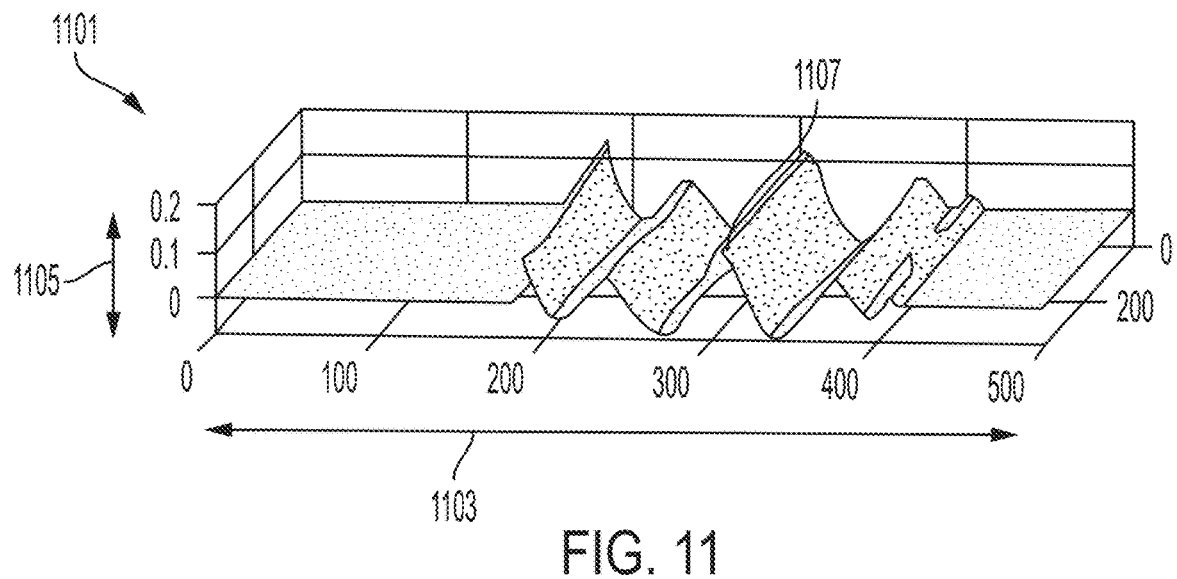
FIG. 11 is a is a graph depicting a group delay associated with a circular reflection signal according to one example of the present disclosure.

FIG. 11 is a graph depicting a group delay spectrum 1101 associated with a circular reflection signal according to one example of the present disclosure. The X-Axis 1103 indicates frequency. The Y-Axis 1105 indicates group delay. The Z-Axis indicates rotation angle of the transducer. The group delay can be computed by subtracting (i) a first group delay of the pulse portion of a reflection signal from (ii) a second group delay derived from a span of the reflection signal that includes both the pulse portion and the reverberation portion. A frequency peak 1107 of the group delay spectrum 1101 may be used to derive an attribute, such as the quality factor or the area described above in block 605 of FIG. 6.

Figure 12:
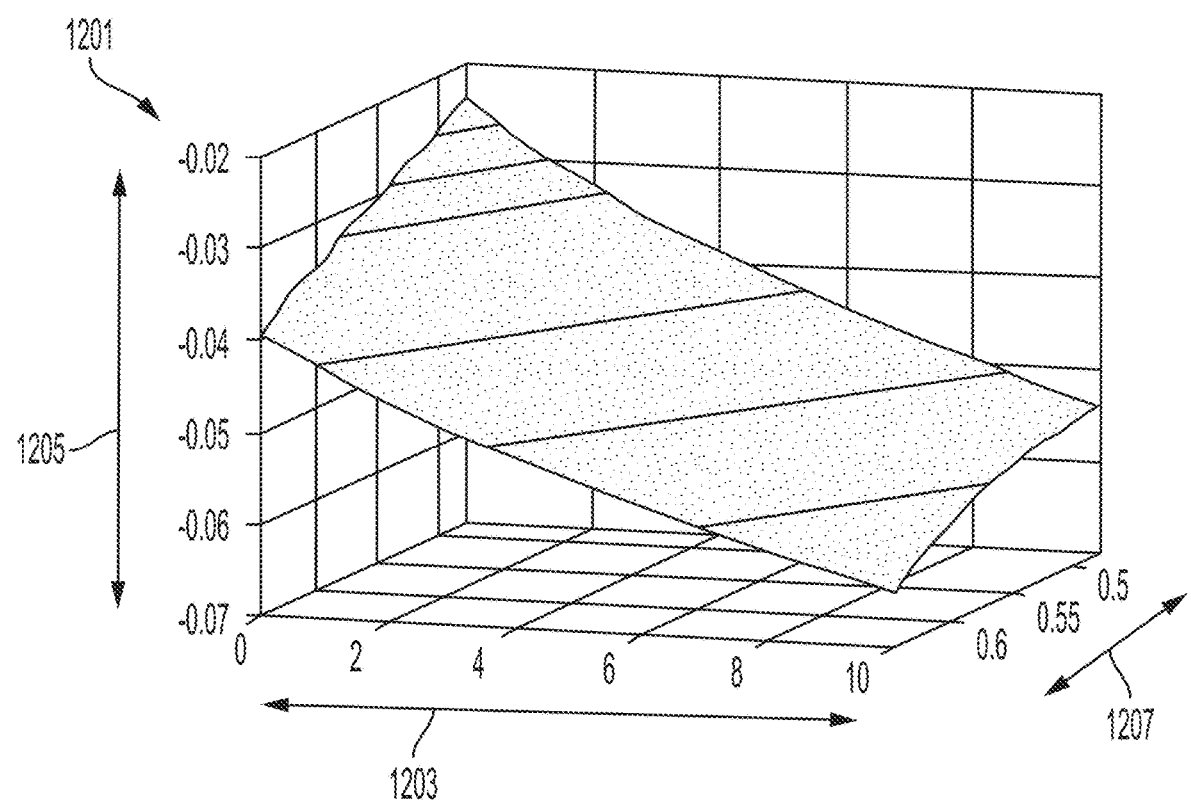
FIG. 12 is graph representing a relationship between cement casing impedance, cement casing thickness, and a quality factor of a frequency peak of a difference spectrum, according to one example of the present disclosure.

FIG. 12 is a graph 1201 representing a relationship between cement casing impedance, cement casing thickness, and a quality factor of a frequency peak of a difference spectrum, according to one example of the present disclosure. The graph 1201 may be useable to derive the look-up table 337 described above in block 609 of FIG. 6. An X-Axis 1203 indicates an impedance of a cement casing. A Y-Axis 1205 indicates the quality factor. A Z-Axis 1207 indicates a cement casing thickness. The frequency peak of the difference spectrum may be determined to provide a plurality of synthetic values across each axis. A plurality of values for cement casing thickness can be derived from the frequency peak and a velocity of acoustic signals through cement. A plurality of values for the quality factor can be derived from a frequency of the frequency peak and a change in frequency across the frequency peak. To improve a linear characteristic of the graph 1201, a natural log of the quality factor or a reciprocal of the quality factor may be used in place of the quality factor.

Figure 13:
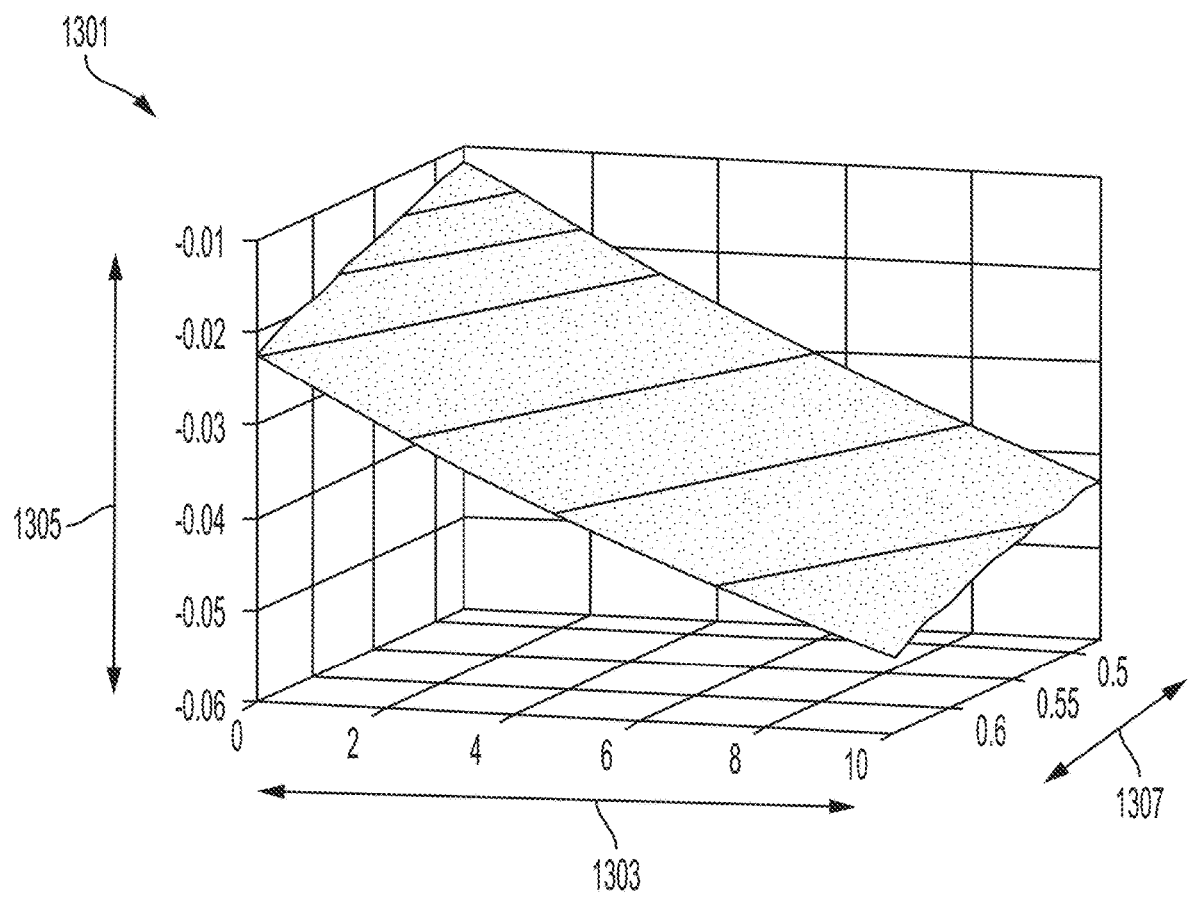
FIG. 13 is graph representing a relationship between cement casing impedance, cement casing thickness, and a quality factor of a frequency peak of a group delay, according to one example of the present disclosure.

FIG. 13 is a graph 1301 representing a relationship between cement casing impedance, cement casing thickness, and a quality factor of a frequency peak of a group delay, according to one example of the present disclosure. The graph 1301 may be useable to derive the look-up table 337 described above in block 609 of FIG. 6. An X-Axis 1303 indicates an impedance of a cement casing. A Y-Axis 1305 indicates the quality factor. A Z-Axis 1307 indicates a cement casing thickness. The frequency peak of the group delay may be determined to provide a plurality of synthetic values across each axis. A plurality of values for cement casing thickness can be derived from the frequency peak and a velocity of acoustic signals through cement. A plurality of values for the quality factor can be derived from a frequency of the frequency peak and a change in frequency across the frequency peak. To improve a linear characteristic of the graph 1301, a natural log of the quality factor or a reciprocal of the quality factor may be used in place of the quality factor.

Figure 14:
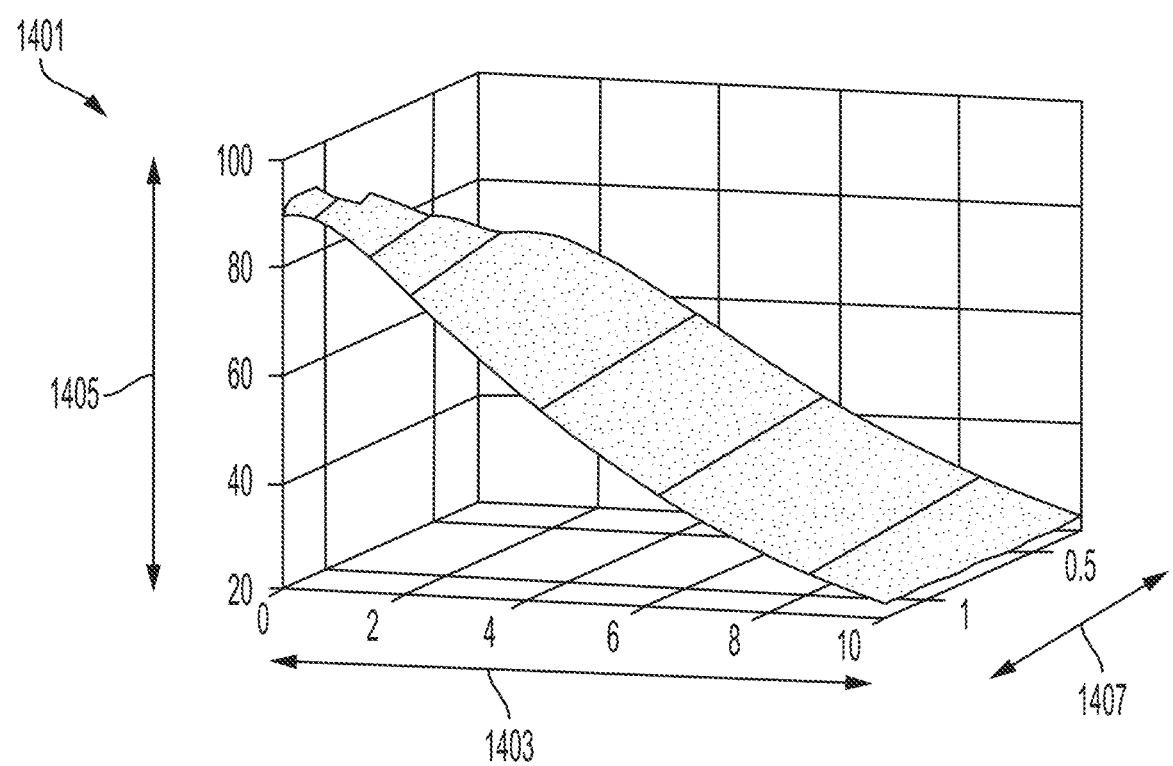
FIG. 14 is graph representing a relationship between cement casing impedance, cement casing thickness, and an area of a frequency peak of a difference spectrum, according to one example of the present disclosure.

FIG. 14 is a graph 1401 representing a relationship between cement casing impedance, cement casing thickness, and an area of a frequency peak of a difference spectrum, according to one example of the present disclosure. The graph 1401 may be usable to derive the look-up table 337 described above in block 609 of FIG. 6. An X-Axis 1403 indicates an impedance of a cement casing. A Y-Axis 1405 indicates the area. A Z-Axis 1407 indicates a cement casing thickness. The frequency peak of the difference spectrum may be determined to provide a plurality of synthetic values across each axis. A plurality of values for cement casing thickness can be derived from the frequency peak and a velocity of acoustic signals through cement. A plurality of values for the area can be derived from a definite integral bound to the frequency peak. To improve a linear characteristic of the graph 1401, a natural log of the area or a reciprocal of the area may be used in place of the area.

Figure 15:
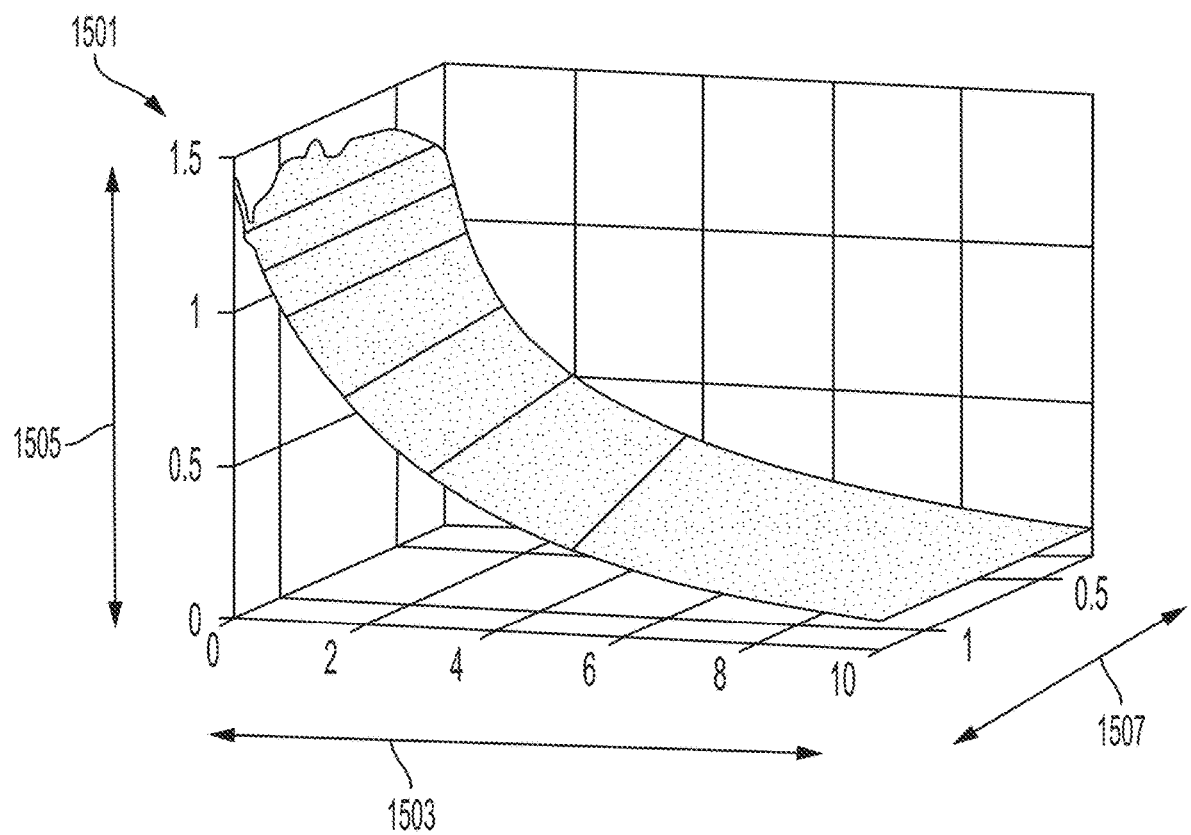
FIG. 15 is graph representing a relationship between cement casing impedance, cement casing thickness, and an area of a frequency peak of a group delay, according to one example of the present disclosure.

FIG. 15 is a graph is a graph 1501 representing a relationship between cement casing impedance, cement casing thickness, and an area of a frequency peak of a group delay, according to one example of the present disclosure. The graph 1501 may be useable to derive the look-up table 337 described above in block 609. An X-Axis 1503 indicates an impedance of a cement casing. A Y-Axis 1505 indicates the area. A Z-Axis 1507 indicates a cement casing thickness. The frequency peak of the group delay may be determined to provide a plurality of synthetic values across each axis. A plurality of values for cement casing thickness can be derived from the frequency peak and a velocity of acoustic signals through a cement. A plurality of values for the area can be derived from a definite integral bound to the frequency peak. To improve a linear characteristic of the graph 1501, a natural log of the area or a reciprocal of the area may be used in place of the area.

In some aspects, systems, methods, and non-transitory computer-readable medium for preventing cement casing failures based on casing acoustic impedance are provided according to one or more of the following examples. As used below, any reference to a series of examples is to be understood as a reference to each of those examples disjunctively (e.g., "Examples 1-4" is to be understood as "Examples 1, 2, 3, or 4").

Example 1 is a system comprising: a well tool configured to transmit a first acoustic signal and a second acoustic signal toward a cement casing in a wellbore, detect a first reflection signal and a second reflection signal from the first acoustic signal and the second acoustic signal reflecting off the cement casing, respectively, and transmit first data representing the first reflection signal and second data representing the second reflection signal. The system also comprises a computing device including a processor and a memory storing instructions that are executable by the processor for causing the processor to: receive the first data representing the first reflection signal; analyze the first data to identify a pulse portion of the first reflection signal, the pulse portion being distinct from and followed by a reverberation portion of the first reflection signal; analyze the pulse portion to determine an actual value for an attribute of the first reflection signal; based on the actual value for the attribute, execute a model to generate a first plurality of synthetic values for the attribute and a second plurality of synthetic values for an impedance of the cement casing; generate a look-up table that correlates the first plurality of synthetic values to the second plurality of synthetic values; receive the second data representing the second reflection signal; determine the impedance of the cement casing based on the second data representing the second reflection signal by referencing the look-up table; and alter a drilling plan or a completion plan based on the impedance of the cement casing.

Example 2 is the system of Example 1, wherein the attribute is (i) a quality factor of a frequency peak, (ii) a natural log of the quality factor, or (iii) an area of the frequency peak.

Example 3 is the system of Example 2, wherein the memory further includes instructions that are executable by the processor for causing the processor to determine the frequency peak from a group delay associated with the first reflection signal.

Example 4 is the system of Example 3, wherein the memory further includes instructions that are executable by the processor for causing the processor to determine the group delay by subtracting (i) a first group delay of the pulse portion of the first reflection signal from (ii) a second group delay of a span of the first reflection signal, wherein the span includes the pulse portion and the reverberation portion.

Example 5 is the system of Example 2, wherein the memory further includes instructions that are executable by the processor for causing the processor to determine the frequency peak from a difference spectrum associated with the first reflection signal.

Example 6 is the system of Example 5, wherein the memory further includes instructions that are executable by the processor for causing the processor to determine the difference spectrum by subtracting (i) a first frequency spectrum of the pulse portion of the first reflection signal from (ii) a second frequency spectrum of a span of the first reflection signal, wherein the span includes the pulse portion and the reverberation portion.

Example 7 is the system of any of Examples 1-6, wherein the memory further includes instructions that are executable by the processor for causing the processor to: determine an area of a frequency peak of (i) a group delay associated with the second reflection signal or (ii) a difference spectrum associated with the second reflection signal; and reference the look-up table to determine the impedance of the cement casing corresponding to the area of the frequency peak.

Example 8 is the system of any of Examples 1-7, wherein the memory further includes instructions that are executable by the processor for causing the processor to: execute the model to generate a third plurality of synthetic values for thicknesses of the cement casing; incorporate the third plurality of synthetic values into the look-up table; and determine a thickness of the cement casing based on the second data representing the second reflection signal by referencing the look-up table.

Example 9 is a method comprising: receiving, by a processor, first data representing a first reflection signal received by a well tool positioned at a first position in a wellbore, wherein the first reflection signal is a first reflection of a first acoustic signal off a cement casing in the wellbore; analyzing, by the processor, the first data to identify a pulse portion of the first reflection signal, the pulse portion being distinct from and followed by a reverberation portion of the first reflection signal; analyzing, by the processor, the pulse portion to determine an actual value for an attribute of the first reflection signal; executing, by the processor and based on the actual value for the attribute, a model to generate a first plurality of synthetic values for the attribute and a second plurality of synthetic values for an impedance of the cement casing; generating, by the processor, a look-up table that correlates the first plurality of synthetic values to the second plurality of synthetic values; receiving, by the processor, second data representing a second reflection signal received by the well tool positioned at a second position in the wellbore, the second position being different from the first position, wherein the second reflection signal is a second reflection of a second acoustic signal off the cement casing in the wellbore; determining, by the processor, the impedance of the cement casing at the second position based on the second data representing the second reflection signal by referencing the look-up table; and altering, by the processor, a drilling plan or a completion plan based on the impedance of the cement casing at the second position.

Example 10 is the method of Example 9, wherein the attribute is (i) a quality factor of a frequency peak, (ii) a natural log of the quality factor, or (iii) an area of the frequency peak.

Example 11 is the method of Example 10, further comprising determining the frequency peak from a group delay associated with the first reflection signal.

Example 12 is the method of Example 11, further comprising determining the group delay by subtracting (i) a first group delay of the pulse portion of the first reflection signal from (ii) a second group delay of a span of the first reflection signal, wherein the span includes the pulse portion and the reverberation portion.

Example 13 is the method of Example 10, further comprising determining the frequency peak from a difference spectrum of the first reflection signal.

Example 14 is the method of Example 13, further comprising determining the difference spectrum by subtracting (i) a first frequency spectrum of the pulse portion of the first reflection signal from (ii) a second frequency spectrum of a span of the first reflection signal, wherein the span includes the pulse portion and the reverberation portion.

Example 15 is the method of any of Examples 9-14, further comprising: determining a quality factor associated with a frequency peak of (i) a group delay associated with the second reflection signal or (ii) a difference spectrum associated with the second reflection signal; and referencing the look-up table to determine the impedance of the cement casing at the second position based on the quality factor.

Example 16 is the method of any of Examples 9-15, further comprising: executing the model to generate a third plurality of synthetic values for thicknesses of the cement casing; incorporating the third plurality of synthetic values into the look-up table; and determining a thickness of the cement casing at the second position based on second data representing the second reflection signal by referencing the look-up table.

Example 17 is a non-transitory computer-readable medium comprising program code that is executable by a processor for causing the processor to: receive first data representing a first reflection signal received by a well tool at a first position in a wellbore, wherein the first reflection signal is a first reflection of a first acoustic signal off a cement casing in the wellbore; analyze the first data to identify a pulse portion of the first reflection signal, the pulse portion being distinct from and followed by a reverberation portion of the first reflection signal; analyze the pulse portion to determine an actual value for an attribute of the first reflection signal; based on the actual value for the attribute, execute a model to generate a first plurality of synthetic values for the attribute and a second plurality of synthetic values for an impedance of the cement casing; generate a look-up table that correlates the first plurality of synthetic values to the second plurality of synthetic values; receive second data representing a second reflection signal received by the well tool at a second position in the wellbore, the second position being different from the first position, wherein the second reflection signal is a second reflection of a second acoustic signal off the cement casing in the wellbore; determine the impedance of the cement casing at the second position based on the second data representing the second reflection signal by referencing the look-up table; and alter a drilling plan or a completion plan based on the impedance of the cement casing at the second position.

Example 18 is the non-transitory computer-readable medium of Example 17, wherein the attribute is (i) a quality factor of a frequency peak, (ii) a natural log of the quality factor, or (iii) an area of the frequency peak.

Example 19 is the non-transitory computer-readable medium of Example 18, further comprising program code that is executable by the processor for causing the processor to: determine the frequency peak from a group delay associated with the first reflection signal; or determine the frequency peak from a difference spectrum of the first reflection signal.

Example 20 is the non-transitory computer-readable medium of any of Examples 17-19, further comprising program code that is executable by the processor for causing the processor to: execute the model to generate a third plurality of synthetic values for thicknesses of the cement casing; incorporate the third plurality of synthetic values into the look-up table; and determine a thickness of the cement casing at the second position based on the second data representing the second reflection signal by referencing the look-up table.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
    a well tool configured to transmit a first acoustic signal and a second acoustic signal toward a cement casing in a wellbore, detect a first reflection signal and a second reflection signal from the first acoustic signal and the second acoustic signal reflecting off the cement casing, respectively, and transmit first data representing the first reflection signal and second data representing the second reflection signal; and
    a computing device including a processor and a memory storing instructions that are executable by the processor for causing the processor to:
        receive the first data representing the first reflection signal;

analyze the first data to identify a pulse portion of the first reflection signal, the pulse portion being distinct from and followed by a reverberation portion of the first reflection signal;

analyze the pulse portion to determine an actual value for an attribute of the first reflection signal;

based on the actual value for the attribute, execute a model to generate a first plurality of synthetic values for the attribute and a second plurality of synthetic values for an impedance of the cement casing;

generate a look-up table that correlates the first plurality of synthetic values to the second plurality of synthetic values;

receive the second data representing the second reflection signal;

determine the impedance of the cement casing based on the second data representing the second reflection signal by referencing the look-up table; and alter a drilling plan or a completion plan based on the impedance of the cement casing.

2. The system of claim 1, wherein the attribute is (i) a quality factor of a frequency peak, (ii) a natural log of the quality factor, or (iii) an area of the frequency peak.

3. The system of claim 2, wherein the memory further includes instructions that are executable by the processor for causing the processor to determine the frequency peak from a group delay associated with the first reflection signal.

4. The system of claim 3, wherein the memory further includes instructions that are executable by the processor for causing the processor to determine the group delay by subtracting (i) a first group delay of the pulse portion of the first reflection signal from (ii) a second group delay of a span of the first reflection signal, wherein the span includes the pulse portion and the reverberation portion.

5. The system of claim 2, wherein the memory further includes instructions that are executable by the processor for causing the processor to determine the frequency peak from a difference spectrum associated with the first reflection signal.

6. The system of claim 5, wherein the memory further includes instructions that are executable by the processor for causing the processor to determine the difference spectrum by subtracting (i) a first frequency spectrum of the pulse portion of the first reflection signal from (ii) a second frequency spectrum of a span of the first reflection signal, wherein the span includes the pulse portion and the reverberation portion.

7. The system of claim 1, wherein the memory further includes instructions that are executable by the processor for causing the processor to:

determine an area of a frequency peak of (i) a group delay associated with the second reflection signal or (ii) a difference spectrum associated with the second reflection signal; and reference the look-up table to determine the impedance of the cement casing corresponding to the area of the frequency peak.

8. The system of claim 1, wherein the memory further includes instructions that are executable by the processor for causing the processor to:

execute the model to generate a third plurality of synthetic values for thicknesses of the cement casing;

incorporate the third plurality of synthetic values into the look-up table; and determine a thickness of the cement casing based on the second data representing the second reflection signal by referencing the look-up table.

9. A method comprising:

receiving, by a processor, first data representing a first reflection signal received by a well tool positioned at a first position in a wellbore, wherein the first reflection signal is a first reflection of a first acoustic signal off a cement casing in the wellbore;

analyzing, by the processor, the first data to identify a pulse portion of the first reflection signal, the pulse portion being distinct from and followed by a reverberation portion of the first reflection signal;

analyzing, by the processor, the pulse portion to determine an actual value for an attribute of the first reflection signal;

executing, by the processor and based on the actual value for the attribute, a model to generate a first plurality of synthetic values for the attribute and a second plurality of synthetic values for an impedance of the cement casing;

generating, by the processor, a look-up table that correlates the first plurality of synthetic values to the second plurality of synthetic values;

receiving, by the processor, second data representing a second reflection signal received by the well tool positioned at a second position in the wellbore, the second position being different from the first position, wherein the second reflection signal is a second reflection of a second acoustic signal off the cement casing in the wellbore;

determining, by the processor, the impedance of the cement casing at the second position based on the second data representing the second reflection signal by referencing the look-up table; and altering, by the processor, a drilling plan or a completion plan based on the impedance of the cement casing at the second position.

10. The method of claim 9, wherein the attribute is (i) a quality factor of a frequency peak, (ii) a natural log of the quality factor, or (iii) an area of the frequency peak.

11. The method of claim 10, further comprising determining the frequency peak from a group delay associated with the first reflection signal.

12. The method of claim 11, further comprising determining the group delay by subtracting (i) a first group delay of the pulse portion of the first reflection signal from (ii) a second group delay of a span of the first reflection signal, wherein the span includes the pulse portion and the reverberation portion.

13. The method of claim 10, further comprising determining the frequency peak from a difference spectrum of the first reflection signal.

14. The method of claim 13, further comprising determining the difference spectrum by subtracting (i) a first frequency spectrum of the pulse portion of the first reflection signal from (ii) a second frequency spectrum of a span of the first reflection signal, wherein the span includes the pulse portion and the reverberation portion.

15. The method of claim 9, further comprising:

determining a quality factor associated with a frequency peak of (i) a group delay associated with the second reflection signal or (ii) a difference spectrum associated with the second reflection signal; and referencing the look-up table to determine the impedance of the cement casing at the second position based on the quality factor.

16. The method of claim 9, further comprising:

executing the model to generate a third plurality of synthetic values for thicknesses of the cement casing;

incorporating the third plurality of synthetic values into the look-up table; and determining a thickness of the cement casing at the second position based on second data representing the second reflection signal by referencing the look-up table.

17. A non-transitory computer-readable medium comprising program code that is executable by a processor for causing the processor to:

receive first data representing a first reflection signal received by a well tool at a first position in a wellbore, wherein the first reflection signal is a first reflection of a first acoustic signal off a cement casing in the wellbore;

analyze the first data to identify a pulse portion of the first reflection signal, the pulse portion being distinct from and followed by a reverberation portion of the first reflection signal;

analyze the pulse portion to determine an actual value for an attribute of the first reflection signal;

based on the actual value for the attribute, execute a model to generate a first plurality of synthetic values for the attribute and a second plurality of synthetic values for an impedance of the cement casing;

generate a look-up table that correlates the first plurality of synthetic values to the second plurality of synthetic values;

receive second data representing a second reflection signal received by the well tool at a second position in the wellbore, the second position being different from the first position, wherein the second reflection signal is a second reflection of a second acoustic signal off the cement casing in the wellbore;

determine the impedance of the cement casing at the second position based on the second data representing the second reflection signal by referencing the look-up table; and alter a drilling plan or a completion plan based on the impedance of the cement casing at the second position.

18. The non-transitory computer-readable medium of claim 17, wherein the attribute is (i) a quality factor of a frequency peak, (ii) a natural log of the quality factor, or (iii) an area of the frequency peak.

19. The non-transitory computer-readable medium of claim 18, further comprising program code that is executable by the processor for causing the processor to:

determine the frequency peak from a group delay associated with the first reflection signal; or determine the frequency peak from a difference spectrum of the first reflection signal.

20. The non-transitory computer-readable medium of claim 17, further comprising program code that is executable by the processor for causing the processor to:

execute the model to generate a third plurality of synthetic values for thicknesses of the cement casing;

incorporate the third plurality of synthetic values into the look-up table; and determine a thickness of the cement casing at the second position based on the second data representing the second reflection signal by referencing the look-up table.

* * * * *